United States Patent [19]

Icking

[11] Patent Number: 4,586,462
[45] Date of Patent: May 6, 1986

[54] SUPPORT AND WITHDRAWAL MECHANISM FOR MILKING CLUSTERS

[75] Inventor: Friedrich Icking, Oelde, Fed. Rep. of Germany

[73] Assignee: Westfalia Separator AG, Oelde, Fed. Rep. of Germany

[21] Appl. No.: 699,779

[22] Filed: Feb. 8, 1985

[30] Foreign Application Priority Data

Feb. 25, 1984 [DE] Fed. Rep. of Germany ....... 3406878

[51] Int. Cl.$^4$ ................................................ A01J 7/00
[52] U.S. Cl. .................................. 119/14.1; 119/14.13
[58] Field of Search ................... 119/14.08, 14.1, 14.13

[56] References Cited

U.S. PATENT DOCUMENTS

| | | | |
|---|---|---|---|
| 3,789,798 | 2/1974 | Reisgies et al. | 119/14.08 |
| 3,861,355 | 1/1975 | Johnson et al. | 119/14.08 |
| 3,929,103 | 12/1975 | Schluckbier | 119/14.08 |

*Primary Examiner*—Hugh R. Chamblee
*Attorney, Agent, or Firm*—Sprung Horn Kramer & Woods

[57] ABSTRACT

In a support and withdrawal mechanism for milking clusters, a support pipe is positioned inside a main column in such a way that it can be rotated and moved up and down inside it. At the bottom of the support pipe is an articulated extension arm with its free end connected to the milking cluster. A clamping component that surrounds the support pipe and in the horizontal position does not impede its free motion is positioned below the main column. The clamping component is secured on one side by a spring and a sloping chain and on the other side by the piston rod of an operating cylinder. The spring, chain, and cylinder are attached to points of suspension on the main column. When the piston rod moves out, the clamping component is tilted and clamps onto the support pipe, carrying the pipe down as it moves. The sloping chain, however, allows a downward motion only if the clamping component simultaneously rotates. This combined lowering and rotating motion is transmitted to the extension arm and generates sloping tension on the milking cluster, initiating the follow-up milking phase.

7 Claims, 4 Drawing Figures

SUPPORT AND WITHDRAWAL MECHANISM FOR MILKING CLUSTERS

BACKGROUND OF THE INVENTION

The present invention relates to a support and withdrawal mechanism for milking clusters and consists of a stationary vertical main column, a support pipe that can be moved up and down inside it and has a horizontal articulated extension arm for holding the milking cluster attached to it, and a flexible tensioning element attached at one end to the last member of the extension arm and at the other end to a retraction device.

A support and withdrawal mechanism of this type is known for example from German OS No. 2 518 326, wherein the milking cluster is suspended from the last member of the horizontal extension arm. The support pipe can be moved axially up and down inside the main column to a proper level in relation to the udder of a cow by means of a motor and threaded spindle. Another motor retracts the flexible tensioning element and removes the extension arm and milking cluster from the vicinity of the udder when a subsiding flow of milk indicates that milking is coming to an end. Since many of the cows, however, are not completely milked out at this point of time, milking must be continued manually or mechanically.

It has turned out to be practical in follow-up milking to exert a tension on the milking cultser that slopes toward the front legs of the cow. A sloping tension of this type cannot be exerted with the known mechanism because the support pipe can only be moved up and down. Another drawback is that the horizontal extension arm remains at the height at which it has been positioned during the milking process and does not follow the varying height of the udder.

A device that allows tension to be exerted on the milking cluster with the extension arm adjusting itself to the varying height of the udder is known from German OS No. 2 654 245. Nevertheless, aside from the need for expensive controls in that device to adjust the extension arm to the height of the udder, the extension arm can still be moved only up and down. Sloping tension is only possible when the force exerted by the extension arm does not act under the center of the udder but eccentrically to it. The anatomy and momentary position of the animal thus prevents precise definition of the direction of tension.

SUMMARY OF THE INVENTION

The object of the present invention is to provide an improved support and withdrawal mechanism of the aforesaid generic type that allows sloping tension that is precisely defined in direction and dimension to be simply and inexpensively exerted on the milking cluster.

This object is attained in accordance with the invention in that the support pipe is mounted in the main column in such a way that it can rotate inside it, in that there is a counterweight inside the support pipe to compensate for its weight, and in that a clamping component that surrounds the support pipe and in the horizontal position does not impede its free motion is positioned below the main column, whereby the two opposing points of suspension for the clamping component are connected to two points of suspension on the main column through an elastic element and an inelastic element that acts in conjunction with the elastic element on the one hand and through an operating cylinder with a piston rod on the other, with the point of suspension for the inelastic element positioned at an acute to right angle to the central axis between the points of suspension for the clamping component.

When the operating cylinder is activated, the piston rod first forces down the side of the clamping component it is attached to, while the opposite side is retained in its initial position by the elastic element. This tips the clamping component and causes it to clamp onto the support pipe. As the piston rod continues to emerge, the clamping component begins to take the support pipe along with it vertically. The special position of the point of suspension of the inelastic element causes the latter to tip, resulting in tension that can be decomposed into vertical and horizontal resulting forces, with the horizontal component extending toward the point of suspension of the inelastic element on the main column and accordingly at an acute to right angle to the central axis of the points of suspension for the clamping component. Since this generates torque on the clamping component and on the support pipe, the support pipe will carry out a combined lowering and rotating motion. The lowering and rotating motion is transferred to the support-pipe extension arm, which will accordingly carry out a vertical and horizontal motion. The resultant of these two motions slopes down and will be transferred in the form of sloping tension to the udder of the cow.

The elastic element can be a spring and the spring maintains one side of the clamping component under tension. The inelastic element is preferably a chain 24.

It is practical for the point of suspension of the chain to be on a strut attached to the main column. There can be several points of suspension at varying distances from the axis of the main column along the strut to adjust the combined lowering and rotating motion. These points of suspension can be generated through a comb-like design of the strut in the form of a number of adjacent slots 30, so the point of suspension can be rapidly and simply changed by suspending the chain from one of the slots. Points of suspension that are remote from the axis of the main column will result in a relatively large lowering and rotating motion and points of suspension that are near the axis will produce the opposite effect. The forces acting on the milking cluster can be varied accordingly.

In one preferred embodiment of the invention the extension arm is in two articulated parts, with the first member rigidly connected to the support pipe and the second member connected to the first in such a way that it can pivot horizontally.

Mounts for the milk hose and the vacuum hose 10 are positioned on the second member of the extension arm and a hook for attaching the milking cluster and an eye for attaching the flexible tensioning element are positioned at its free end.

A preferred embodiment of the invention will now be described with reference to the attached drawings, wherein

DETAILED DESCRIPTION OF THE PREFERRED EMBODIMENTS

Figure 1:
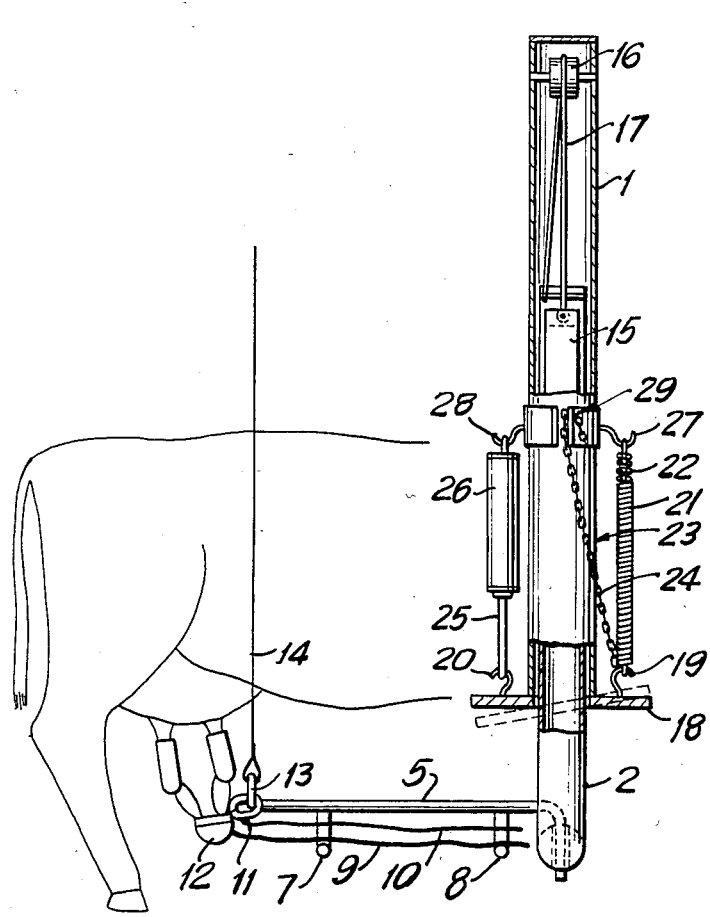
FIG. 1 is a partial section through a support and withdrawal mechanism.
Figure 2:
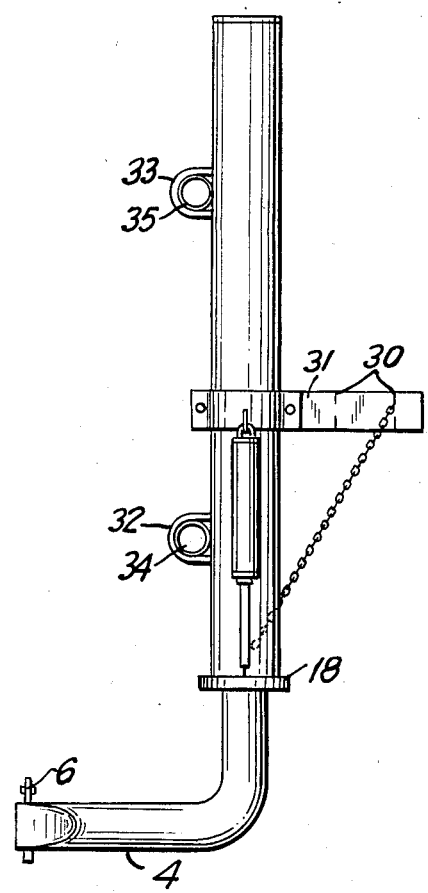
FIG. 2 is a side view of the machanism illustrated in FIG. 1.
Figure 3:
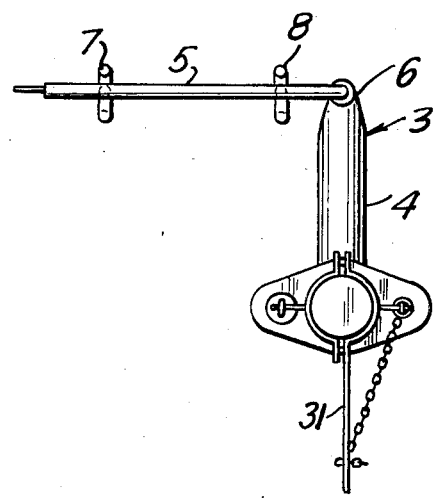
FIG. 3 is a top view of the mechanism illustrated in FIG. 1 showing the position of the extension arm during the main milking stage.
Figure 4:
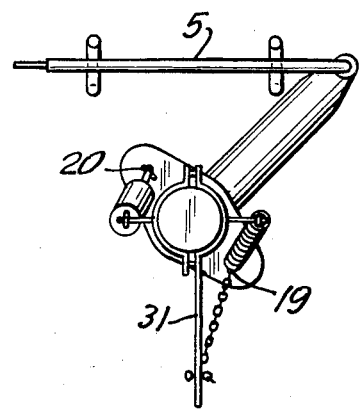
FIG. 4 is a top view of the mechanism illustrated in FIG. 1 showing the position of the extension arm during follow-up milking.

A support pipe 2 is mounted in a main column 1 in such a way that it can move axially and rotate inside it. An extension arm 3 is positioned at the bottom of support pipe 2. The first member 4 of extension arm 3 is rigidly connected to support pipe 2 and its second member 5 connected to the first member at a joint 16 in such a way that the second member can pivot horizontally. Mounts 7 for a milk hose 9 and 8 for a vacuum hose 10 are positioned on the second member of the extension arm and a hook 11 for attaching a milking cluster 12 and an eye 13 for attaching a flexible tensioning element 14 are positioned at its free end. A counterweight 15 is positioned inside support pipe 2 and connected to the pipe by means of a rope 17 that travels around a pulley 16 in such a way that the inherent weight of the pipe and of all the components connect to it are compensated.

Below main column 1, support pipe 2 is enclosed in a clamping component 18 that has two opposing points of suspension 19 and 20. An elastic element 21 in the form of a spring 22 and an inelastic element 23 in the form of a chain 24 are suspended from point 19 and the piston rod 25 of an operating cylinder 26 is suspended from point 20. The free end of spring 22 and operating cylinder 26 are suspended from points of suspension 27 and 28 on main column 1 in such a way as to move freely and retain clamping component 18 in a horizontal position when piston rod 25 is retracted, with the clamping component 18 resting against the bottom of main column 1. Chain 24 is suspended at its free end from one of the points of suspension 29 in the form of slots 30 in a strut 31 that is attached to main column 1. The support and withdrawal mechanism as a whole can be attached in an appropriate position to pipes 34 and 35 on the milking stand by means of points of attachment 32 and 33 applied to main column 1.

Before milking commences, piston rod 25 is in the retracted position, with clamping component 18 accordingly horizontal and allowing support pipe 2 to move freely. The milking cluster 12 attached to extension arm 3 can therefore be easily moved into the desired position below the udder of the cow. Main colum 1 is attached to the milking stand in such a way that, when milking cluster 12 is applied to the udder, the first member 4 of extension arm 3 will extend at an angle and its second member 5 parallel to the longitudinal axis of the cow between the udder and the front legs.

During the milking process, the free motion of support pipe 2 allows milking cluster 12 to adjust to every change in position of the udder, ensuring uniform tension of the cluster on the udder. When the flow of milk begins to recede, the follow-up stage of milking is initiated by activating operating cylinder 26. Piston rod 25 travels out, first tilting clamping component 18, which is initially retained in position on the opposite side by spring 22, as indicated by the broken line in FIG. 1. Clamping component 18 is accordingly secured to support pipe 2. As piston rod 25 continues to travel out, support pipe 2 lowers, upon which the sloping chain 24 produces a horizontal resulting force on point 19 of suspension in such a way as to generate torque on clamping component 18 and hence on support pipe 2.

The resulting rotation of support pipe 2 is oriented in such a way that the first member 4 of extension arm 3 is pivoted toward the front leg of the cow and a second member 5 is also pulled in the same direction. Since extension arm 3 simultaneously lowers, there will be a resultant force on milking cluster 12 in the form of a tension that slopes toward the front legs of the cow. The dimension of this force can be affected by selecting the appropriate slot 30 as a point of suspension for chain 24. Upon termination of milking, piston rod 25 is retracted into its original position, allowing support pipe 2 to move freely again. Finally, milking cluster 12 is released from the udder by tensioning flexible tensioning element 14 with a removing device, not illustrated.

It will be appreciated that the instant specification and claims are set forth by way of illustration and not limitation, and that various modifications and changes may be made without departing from the spirit and scope of the present invention.

What is claimed is:

1. A mechanism for supporting and withdrawing a milking cluster, comprising: a stationary vertical hollow main column; a support member slidably mounted in the bottom of the main column for rotation relative thereto and for up and down movement relative thereto, wherein the support member has a horizontal extension arm for holding a milking cluster at one end of the arm; a flexible tensioning element attached to said one end of the extension arm and attachable to a retraction device; means for compensating for the weight of the support member comprising a counterweight in the main column, a pulley connected in the main column above the support member and a cable extending around the pulley and connected to the counterweight and the support member; a clamping element surrounding the support member below the main column and movable between a horizontal position wherein the support member is free to move up and down and rotatably relative to the clamping element and a tilted position wherein the clamping element moves with the support member; means mounting the clamping element comprising means forming two opposing suspension points on the clamping element and three suspension points on the main column including two suspension points aligned with the two suspension points on the clamping element and a third suspension point disposed at an acute to a right angle to a central axis between the points of suspension of the clamping element; an elastic element connecting one pair of the two aligned points of suspension on the main column and the clamping element; an inelastic element connecting said third suspension point on the main column and the suspension point on the clamping element for the elastic element; means including a cylinder and piston assembly connected between the other pair of two aligned points of suspension on the main column and the clamping element for effecting movement of the clamping element between the horizontal and tilted position in response to movement of the piston relative to the cylinder between a retracted and extended position; whereby upon the stopping of milk flow the piston extends to first tilt the clamping element so that it moves with the support member and thereafter effect the lowering and in connection with the inelastic element generate a torque on the clamping element and thus the support member to produce a movement of the horizontal arm which slopes downward and away from a cow's udders.

2. The mechanism as in claim 1, wherein the elastic element is a spring.

3. The mechanism as in claim 2, wherein the inelastic element is a chain.

4. The mechanism as in claim 3, wherein the means forming the third suspension point comprises a strut attached to the main column.

5. The mechanism as in claim 4, wherein the strut has several slots as points of suspension.

6. The mechanism as in claim 1, wherein the extension arm comprises two articulated parts, with a first member rigidly connected to the support member and a second member connected to the first such that it can pivot horizontally.

7. The mechanism as in claim 6, further comprising mounts for a milk hose and a vacuum hose positioned on the second member of the extension arm and a hook for attaching a milking cluster and an eye for attaching the flexible tensioning element positioned at the free end of the second member.

* * * * *